US008583495B2

(12) United States Patent
Glatt et al.

(10) Patent No.: US 8,583,495 B2
(45) Date of Patent: Nov. 12, 2013

(54) METHOD AND SYSTEM FOR CREDITING MULTIPLE MERCHANT ACCOUNTS ON A SINGLE BILL

(75) Inventors: Terry L. Glatt, Pompano Beach, FL (US); Sam M. Zietz, Boca Raton, FL (US); Philip A. Betts, West Palm Beach, FL (US); Damon T. Young, Miami Beach, FL (US); Carolyn Bruscino, Deerfield Beach, FL (US)

(73) Assignee: Invenstar, LLC, Boca Raton, FL (US)

( * ) Notice: Subject to any disclaimer, the term of this patent is extended or adjusted under 35 U.S.C. 154(b) by 860 days.

(21) Appl. No.: 12/575,833

(22) Filed: Oct. 8, 2009

(65) Prior Publication Data

US 2010/0205062 A1 Aug. 12, 2010

Related U.S. Application Data

(60) Provisional application No. 61/104,153, filed on Oct. 9, 2008.

(51) Int. Cl.
| | | |
|---|---|---|
| *G06Q 10/00* | (2012.01) | |
| *G06Q 20/00* | (2012.01) | |
| *G07B 17/00* | (2006.01) | |
| *G06Q 30/00* | (2012.01) | |
| *G06Q 20/20* | (2012.01) | |
| *G06Q 40/00* | (2012.01) | |

(52) U.S. Cl.
CPC .............. *G06Q 30/00* (2013.01); *G06Q 20/204* (2013.01); *G06Q 20/206* (2013.01); *G06Q 40/00* (2013.01)
USPC ........... 705/17; 705/7.13; 705/14.49; 705/30; 705/35; 705/40; 186/36; 186/53; 186/55

(58) Field of Classification Search
CPC ....... G06Q 30/00; G06Q 10/00; G06Q 20/00; G07B 17/00; G07F 19/00
USPC ........... 705/14.49, 34, 30, 3, 39, 32, 7.13, 40, 705/26.8; 186/36, 53, 55
See application file for complete search history.

(56) References Cited

U.S. PATENT DOCUMENTS

| 4,111,282 A * | 9/1978 | Vayda, Jr. .................... 186/36 |
|---|---|---|
| 5,158,155 A * | 10/1992 | Domain et al. .............. 186/53 |
| 6,527,176 B2 * | 3/2003 | Baric ........................... 235/381 |
| 8,099,361 B1 * | 1/2012 | Gupta et al. .................. 705/40 |
| RE43,220 E * | 2/2012 | Tillman ..................... 705/26.41 |
| 8,145,569 B2 * | 3/2012 | Gong ............................ 705/44 |
| 2002/0032651 A1 * | 3/2002 | Embrey ........................ 705/40 |
| 2002/0046070 A1 * | 4/2002 | Konishi .......................... 705/7 |
| 2002/0069188 A1 * | 6/2002 | Anvekar et al. .............. 705/412 |

(Continued)

OTHER PUBLICATIONS

Verifone, Inc., Onmi 37xx Instalation Guide, 2002, 1-39.

*Primary Examiner* — Matthew Gart
*Assistant Examiner* — Olusegun Goyea
(74) *Attorney, Agent, or Firm* — Duane Morris LLP; Pablo Meles

(57) ABSTRACT

A system includes a device and software with a touchscreen, cash drawer, bar code scanner, and other point-of-sale peripherals. The device processes payments according to a method and can process a payment from multiple payment sources to multiple credit-card merchant accounts. Likewise, the system processes returns according to a method from multiple-merchant accounts. A scheduler is included with an appointment builder and manager that are especially useful in a beauty salon environment and other schedule-intensive service businesses.

17 Claims, 2 Drawing Sheets

(56) References Cited

U.S. PATENT DOCUMENTS

| | | | |
|---|---|---|---|
| 2002/0082854 A1* | 6/2002 | Furuta et al. | 705/1 |
| 2002/0103753 A1* | 8/2002 | Schimmel | 705/39 |
| 2002/0107767 A1* | 8/2002 | McClair et al. | 705/35 |
| 2005/0280555 A1* | 12/2005 | Warner, IV | 340/932.2 |
| 2006/0085335 A1* | 4/2006 | Crawford et al. | 705/40 |
| 2006/0089873 A1* | 4/2006 | Stewart et al. | 705/14 |
| 2006/0089877 A1* | 4/2006 | Graziano et al. | 705/14 |
| 2006/0249531 A1* | 11/2006 | Litchfield | 222/52 |
| 2007/0288643 A1* | 12/2007 | Patterson | 709/229 |
| 2007/0299736 A1* | 12/2007 | Perrochon et al. | 705/26 |
| 2008/0133387 A1* | 6/2008 | Zalta | 705/32 |
| 2009/0112759 A1* | 4/2009 | Foster | 705/40 |
| 2009/0259727 A1* | 10/2009 | Patterson | 709/206 |
| 2010/0030578 A1* | 2/2010 | Siddique et al. | 705/3 |
| 2010/0094739 A1* | 4/2010 | Ellis et al. | 705/35 |
| 2010/0185540 A1* | 7/2010 | Hahn-Carlson et al. | 705/34 |
| 2010/0191645 A1* | 7/2010 | Hougland et al. | 705/39 |
| 2010/0205062 A1* | 8/2010 | Glatt et al. | 705/17 |
| 2010/0217699 A1* | 8/2010 | Bookstaff | 705/35 |
| 2010/0299235 A1* | 11/2010 | Marshall | 705/32 |
| 2011/0010271 A1* | 1/2011 | Black et al. | 705/27.2 |
| 2011/0029418 A1* | 2/2011 | Marshall | 705/30 |
| 2011/0112940 A1* | 5/2011 | Marshall | 705/30 |
| 2011/0184834 A1* | 7/2011 | Perrochon et al. | 705/26.8 |
| 2011/0201306 A1* | 8/2011 | Ali Al-Harbi | 455/411 |
| 2012/0136752 A1* | 5/2012 | Gupta et al. | 705/26.8 |

* cited by examiner

METHOD AND SYSTEM FOR CREDITING MULTIPLE MERCHANT ACCOUNTS ON A SINGLE BILL

CROSS-REFERENCE TO RELATED APPLICATIONS

This application claims the benefit of U.S. Provisional Application No. 61/104,153, filed Oct. 9, 2008.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a system for point-of-sale, and inventory management, appointment scheduling, and client payments with multiple payment methods including credit cards. The system is particularly related to businesses where there can be independent operators (e.g. vendors) within the business such as beauty salons.

2. Description of the Related Art

VERIFONE® sells payment systems. An example of a countertop terminal used for making single charges is sold by VERIFONE® under the trade name OMNI 3750.

Prior-art credit-card terminals can bill a credit card and credit a corresponding merchant account. The terminal reads account information from a card, for example, by swiping the card and reading account information from the credit card's magnetic strip. An amount to be held or charged is entered into the terminal. The terminal then makes a connection to a credit-card processor or payment gateway, both of which are referred to in this application as a "processor". The processor charges (i.e. deducts) from the credit-card account related to the credit card that was read. The processor charges a fee for processing the transaction. The processor transfers the remaining balance to the merchant account (i.e. the account of the merchant who is selling the service or the good). A client (i.e. a purchaser) can request a return credit. In such a case, the purchase price and processing fee are returned to the client's credit-card account.

Existing terminals read only one credit card and credit only one merchant account in a given transaction.

Some credit card terminals (e.g. VERIFONE® OMNI 3750) can be programmed to support multiple merchant accounts. However, each client transaction can be directed to only one of the given merchant accounts at a time. In other words, the system does not allow a client transaction to be split among merchant accounts.

In beauty salons for example, scheduling is important and difficult when a client is using multiple independent vendors who pay "rent" to operate and should receive all monies charged from a client (vendors, for example, a colorist, a hair cutter, and a manicurist). Typically, a client will want to schedule appointments sequentially. In addition, different clients want different combinations of vendors. The vendors want combinations that allow them to make the most money in a given period of time without them being idle.

Current systems use paper calendar books to "block out" scheduled time. Such systems are not able to optimize a schedule to meet the needs listed previously, and are inflexible while offering no reporting capabilities.

A need exists to track client preferences, purchases, and scheduling and to tie them to the scheduling system.

Customers and merchants need a system to provide a single transaction in which multiple vendors are credited. The system needs to be able to accommodate multiple payment means. The system needs to be able to credit a client from multiple merchant accounts for a refund.

When merchants work within a salon, a system that credits the salon's merchant account and then pays to the merchant account, results in extra credit-card processing fees being charged compared to a single transaction. Likewise, if the money is paid to the merchant account, and then the merchant pays a portion to the house's merchant account, then an extra credit-card processing occurs. Accordingly, there is a need to pay merchants and a house without paying extra credit-card processing fees.

Applying for a credit-card merchant account may take a merchant at least several days and may extend into weeks. Some merchants may not have established the necessary prerequisites for a credit-card merchant account so the merchant may never qualify. Without a credit-card merchant account, the merchant cannot receive credit-card payments directly. If a system is in place in a business where all of the other merchants are being paid directly into merchant accounts, the existence of a merchant without an account may make the accounting for the new merchant much more difficult for the business. Accordingly, a need exists for quickly provisioning a new merchant in a multi-vendor business with a credit card merchant account.

BRIEF SUMMARY OF THE INVENTION

It is accordingly an object of the invention to provide a touchscreen system for the fastest and most effective input for scheduling (booking) appointments, and that overcomes the above-mentioned disadvantages of the heretofore-known devices and methods of this general type.

With the foregoing and other objects in view there is provided, in accordance with the invention, a method for crediting multiple merchants in a single transaction. The first step of the method is charging a client a sum in a given transaction. The sum combines a first charge for services or goods provided by a first merchant and a second charge for goods or services from a second merchant, and so on. The next step is paying at least a portion of the first charge to a merchant account of the first merchant. The next step is paying at least a portion of the second charge to a second merchant account of the second merchant. While multiple transactions may occur at the processor, the terminal of the house provides to the customer a combined statement that includes multiple transaction in what look like one bill. Multiple merchants are paid in one transaction.

In accordance with a further object of the invention, the charging step includes charging at least a portion of the sum on a credit card of a customer. The entire amount may be paid by a single credit card as well.

In accordance with a further object of the invention, the method includes transmitting split or apportionment information to a credit card processor. The split information describes a portion of the charge to be transmitted to the first merchant and a portion of the charge to be transmitted to the second merchant.

In accordance with a further object of the invention, the information collected about a transaction (i.e. amount, split information, account number) is transmitted to a credit-card processor. The processor may be connected to the terminal over a network such as the Internet. The processor performs the apportionment of the charge to the merchant accounts based on the information received from the system. In accordance with a further object of the invention, a processor fee is deducted by the processor from the sum before performing the paying steps.

In accordance with a further object of the invention, the method provides for a portion of charges to be paid to the house. The portion for the house can be sent to the processor by the terminal as separate transactions. The portion paid to the house can be hidden from the customer.

In accordance with a further object of the invention, a method refunds a client who has had a single transaction paid to multiple merchants. According to the method, payments previously made to the merchant accounts are reversed and the client can receive the total in a single refund. The method allows for single, multiple (but not all), or all merchant accounts in a transaction to refund the client depending on what services or goods are to be credited.

In accordance with a further object of the invention, a method and system for apportioning a bill among customers paying with respective credit cards is provided. The customers can determine which percentage or amount of a combined bill for which each customer is responsible.

In accordance with a further object of the invention, a customer or customers can tell the house how to apportion a credit-card payment among merchants. The apportionment information can be an amount specified for each merchant or a percentage.

The invention can include a system that combines a touchscreen computer terminal and a method of performing transaction that can utilize the touchscreen computer terminal. The system allows for single transactions to be split between multiple merchant accounts.

The system combines a number of databases. The databases are interconnected relational databases. The databases are sortable by field and frequency of use and are searchable. The system includes a client database. The client database includes biographical information such as name, address, email, telephone number, mobile phone number, frequency of appointments, and reminder time. The system includes a merchant database. The merchant database includes the merchant name, merchant account information, payment system (i.e. renter, commission, commission rates for services, and commission rates for products), services offered, time allocated per service, charge per service). The system includes a service database. The system database includes default time allotments, and required resources. The system database can be sorted by the frequency that the service is ordered. The system includes a product database. The product database includes a database of products, customer cost, and profit per sale. The database includes a calendar. The calendar includes information when seats are available, when merchants are available, and when merchants and seats and customers are booked. The databases are then related. For example, the services and merchants are related to a customer. The booking times and availability are correlated to the calendar. The calendar is related to the client information for reminders and scheduling new appointments.

The system provides a means for updating the databases. The means may be any human interface device and could be, by way of example, a keyboard, touchscreen, mouse, or downloaded information.

When a client is serviced by multiple merchants (e.g. stylists in a salon), a common ticket is prepared. The system vendor can receive payments from multiple sources (i.e. an electronic funds transfer, cash and only one or multiple credit cards, ATM cards, debit cards, gift cards, and gift certificates) and then distribute them to multiple merchant accounts in a single transaction to pay the ticket. When preparing the ticket, information is pulled from the database. The defaults entered on the ticket may be overridden if necessary. For example, the client can provide multiple forms of payment, including, but not limited to, cash, checks, a single credit card, multiple credit cards, gift cards, and wire transfers. The payment is then distributed to merchants who provided the service. Each merchant can include apportionment information to provide payment for a house merchant with whom the merchants have subcontracted.

The invention also includes simplicity in the "inverse" situation: that is, managing refunds from tickets completed as above. This is very unique as the prior art involves a very manual, disconnected process. Here a client may return to obtain a refund on a product or service from a multi-provider (multi-account) ticket. The system executes a method in the form of a "Refund Wizard" that allows for simple and fast selection of the item and application to a refund transaction according to how it was originally paid.

In accordance with a further object of the invention, the invention provides a method for a house account (i.e. a salon) to credit merchant accounts with only one transaction fee being charged. The system charges a processor fee (usually a percentage of each transaction) from the merchant. The house only pays a transaction fee on the fees collected to the house's merchant fees. This contrasts some prior art systems where the house collects an entire transaction and pays the entire merchant fee and then distributes the collected money to the sub-merchants. In such prior-art cases, the house must apportion the merchant fee and deduct the apportionment from each distribution or absorb the entire amount of the merchant fee.

In accordance with a further object of the invention, a method for refunding a failed transaction is provided. A ticket may include a plurality of charges. As stated, each charge might be credited to a different merchant account. If a given charge is declined, then previously-approved charges are voided by the system. The reason why the given transaction is declined is provided. Typical reasons for a transaction to be declined are the credit-card balance being exceeded by the given charge or the merchant account being improperly configured. After the reason for declining is displayed, the client can reenter the payment screen. In the payment screen, the client can enter a new means for payment or a new combination of means for payment.

The client is given the option to finish with no receipts. If selected, only a carbon copy (i.e. merchant copy) signature sheet is printed; no customer copy is printed.

A touchscreen ticket manager and cash register is encompassed by the invention. The ticket manager builds a ticket (i.e. an invoice) from the services and goods that are sold. A default price is entered for each service. A given service provider can override and enter a provider default for the given service. The ticket manager employs a touchscreen method for allowing default amounts to be adjusted by dollar amounts and by percentage. The prices can be adjusted on the fly. The stylist can add services to the ticket even if the service was not originally scheduled. The ticket is populated initially by the default user prices or the default shop/house prices if no vendor prices have been set.

Future appointments are printed on the client's receipt. This prevents the need for separate appointment cards.

In accordance with a further object of the invention, the system includes a touchscreen method of scheduling appointments. A client often wants to schedule a series of appointments (i.e. services) in one visit. The appointments may need to be in a particular sequence (i.e. hair coloring before hair cutting). The system allows a user to select the services and optionally to order (i.e. sequence) those services. The system allows the user to specify particular merchants (i.e. a particular stylist or colorist) to provide the selected services. The system can then generate available appointments that meet the conditions. In particular, the system might generate the first available appointments or the availability of the appointments on a given day. If no available appointments are satisfactory, the client can broaden the criteria or deselect some of the services. The client then books the appointments and the appointments are saved in the calendar. The invention provides for a touchscreen method for appointments' default duration and price to be manually overridden, which is called being "nudged".

The scheduler allows for touchscreen double-booking and processing time (i.e. "squeezing in"). Double booking is when two clients are booked at overlapping times. Processing time is time in an appointment where the client can be left unattended. For example, when a client is getting a hair coloring treatment, a processing time of thirty minutes may be included. During the processing time, the vendor can "squeeze in", i.e. provide services to a second customer. The scheduler confirms that double-booked services conform to the processing time of the other service.

An object of the invention is to provide an interface that works with a touchscreen to enter data, as opposed to a mouse and keyboard. Innovative touchscreen methods are employed instead of drag and drop scheduling and point-and-clicking, for making changes to appointments and for entering data.

The scheduler provides a touchscreen method for scheduling standing appointments (i.e. every Friday at 5 PM for one hour). The scheduler also can remind clients to schedule their next appointments when paying for their current service. The system can include a reminder to the staff to contact the client to schedule their next appointment. If a conflict exists with a standing appointment, a conflict can be corrected by manually changing the appointment to a non-conflicting time.

A touchscreen appointment manager confirms, checks in, and checks out exiting appointments. As an appointment arrives, the client is checked in using the touchscreen, the appointment changes color, and the time of arrival is recorded. As an appointment is ready to leave, the client is checked out, the appointment changes color again, and the time of departure is recorded along with their payment transaction. The data regarding actual appointment services, products, and pricing is managed in a touchscreen Ticket Manager which provides a touchscreen method for adjusting actual price, assigning service and product sales to staff for accounting and reporting, as well as implementing promotional discounts using a percentage or amount discount per line item. The completed appointment with final transaction information is recorded and can be used for analysis of the shop's performance. Once the check out process is complete (i.e. credit card or cash transaction) and the cash drawer is opened and receipts are printed, the user can be returned right back to the book on Today with the schedule centered on the current time. The touchscreen appointment manager also allows booking notes to be entered with appointments such as, "Will be five minutes late."

The system can include a "trade show" function. The trade show function can download information about new products, services, trends, blogs, and other trade information. The data can be delivered, for example, by Really Simple Syndication (RSS) Feeds, social networking feeds, web sites and vendor broadcasts.

The touchscreen appointment manager includes waitlist management. A client can be added to a vendor's waitlist, a timeslot's waitlist, or a service's waitlist. If a vendor, timeslot, or service becomes available, the contact information of the client is displayed so that the appointment can be booked.

The appointment manager can send messages (i.e. SMS text messages, voice messages, or emails) to vendors to remind the vendors of appointments. The appointment manager can send messages (i.e. SMS text messages, voice messages, or emails) to clients to remind the clients of appointments. The appointment manager can include a header so when a client or vendor replies, the appointment is confirmed or canceled.

In accordance with a further object of the invention, a method is provided for rapidly provisioning merchants operating within a multi-vendor business with a credit-card merchant account. Multi-vendor businesses need to provide a method for newly-hired merchants to be reimbursed for goods or services sold while working within the multi-vendor business. Because the merchant's application may not qualify for a merchant account and because it may take days for a credit card processor to provision a merchant account, a need exists for the multi-vendor business to have pre-established, pre-qualified merchant accounts in place that can be leased to the merchant as soon as the merchant is ready to work. The pre-established, pre-qualified merchant account can be reconfigured when the merchant is replaced with another merchant. The availability of pre-qualified pre-established merchant accounts will attract merchants to the multi-vendor business compared to those without pre-qualified pre-established merchant accounts because the merchants can enter and begin working immediately.

Merchants using pre-qualified pre-established merchant accounts of the multi-vendor business can rent the merchant accounts from the business. The rent can be a flat fee, for example, a monthly flat fee.

To assign a pre-qualified pre-established merchant account to a merchant, the bank account to where the merchant account is settled is changed. A percentage of any settlement can also be directed to a bank account of the business. If a merchant leaves or is replaced, the settlement account is disable or reassigned to a new merchant.

Merchants looking to establish a business quickly by receiving credit-card payments will be attracted to businesses that have pre-qualified pre-established merchant accounts ready for rental.

A computer system records all of the incoming and outgoing transactions. In this way, transactions can be reversed for providing refunds. Accounting statements are provided to the merchants. The calculations are performed by the computer so the business owner does not need to perform calculations.

The computing system is based upon a suitably configured processing system adapted to implement an exemplary embodiment of the present invention. For example, a personal computer, workstation, or the like, may be used. The computing system can include one or more processors. The processor is connected to a communication infrastructure (e.g., a communications bus, crossover bar, or network). After reading this description, it becomes apparent to a person of ordinary skill in the relevant art(s) how to implement the invention using other computer systems and/or computer architectures.

The computing system can include a display interface that forwards graphics, text, and other data from the communication infrastructure (or from a frame buffer) for display on the display unit. The computing system also includes a main memory, preferably random access memory (RAM), and may also include a secondary memory as well as various caches and auxiliary memory as are normally found in computer systems. The secondary memory may include, for example, a hard disk drive and/or a removable storage drive, representing a floppy disk drive, a magnetic tape drive, an optical disk drive, and the like. The removable storage drive reads from and/or writes to a removable storage unit in a manner well known to those having ordinary skill in the art.

A removable storage unit, represents a floppy disk, a compact disc, magnetic tape, optical disk, etc. which is read by and written to by removable storage drive. As are appreciated, the removable storage unit includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may include computer readable information in a transitory state medium such as a network link and/or a network interface, including a wired network or a wireless network that allow a computer to read such computer-readable information.

The secondary memory may include other similar means for allowing computer programs or other instructions to be loaded into the computing system. Such means may include, for example, a removable storage unit and an interface. Examples of such may include a program cartridge and cartridge interface (such as that found in video game devices), a removable memory chip (such as an EPROM, or PROM) and associated socket, and other removable storage units and interfaces that allow software and data to be transferred from the removable storage unit 222 to the computing system 200.

The computing system can include a communications interface that acts as an input and output and allows software and data to be transferred between the computing system and external devices or access points via a communications path. Examples of communications interface may include a modem, a network interface (such as an Ethernet card), a communications port, a PCMCIA slot and card, etc. Software and data transferred via communications interface are in the form of signals which may be, for example, electronic, electromagnetic, optical, or other signals capable of being received by communications interface. The signals are provided to communications interface via a communications path (i.e., channel). The channel carries signals and may be implemented using wire or cable, fiber optics, a phone line, a cellular phone link, an RF link, and/or other communications channels.

In this document, the terms "computer program medium," "computer usable medium," "computer readable medium", "computer readable storage product", and "computer program storage product" are used to generally refer to media such as main memory and secondary memory, removable storage drive, and a hard disk installed in hard disk drive. The computer program products are means for providing software to the computer system. The computer readable medium allows the computer system to read data, instructions, messages or message packets, and other computer readable information from the computer readable medium.

Computer programs (also called computer control logic) are stored in main memory and/or secondary memory. Computer programs may also be received via communications interface. Such computer programs, when executed, enable the computer system to perform the features of the various embodiments of the present invention as discussed herein. In particular, the computer programs, when executed, enable the processor to perform the features of the computer system.

Other features that are considered as characteristic for the invention are set forth in the appended claims.

Although the invention is illustrated and described herein as embodied in a multiple merchant account touchscreen point of sale software computer system and/or a credit card payment processor or gateway and method for crediting and refunding to and from multiple merchant accounts, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
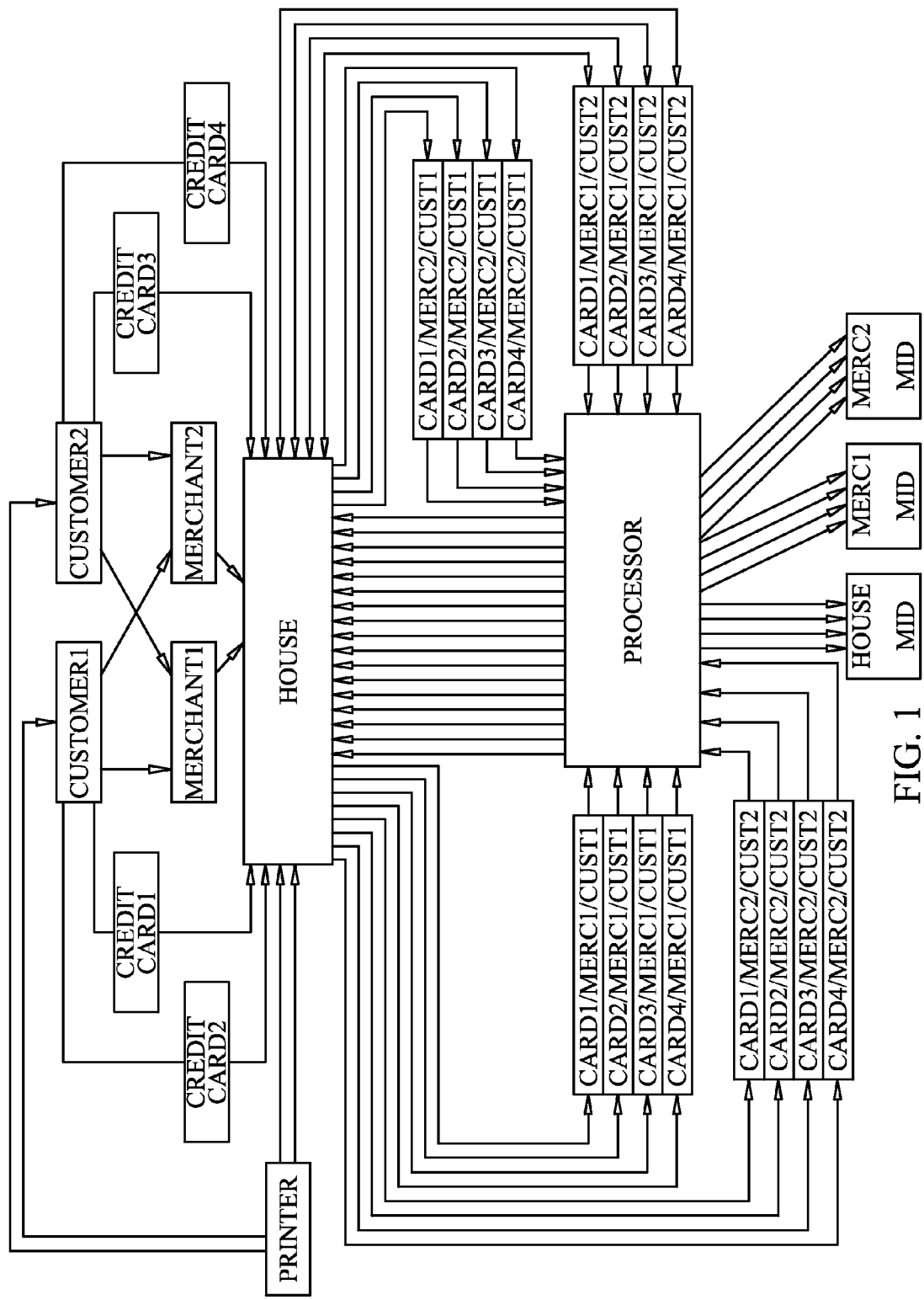
FIG. 1 is a schematic diagram of a purchase.

A preferred embodiment of the invention provides a touchscreen system for charging a client of a retail business, for example, a beauty salon, for purchases made from merchants with their own merchant accounts.

The invention employs a unique pyramidal touchscreen user interface methodology whereby each function; clients, staff, services, products, vendors, etc. is presented in a very simple list format first using large font and the entire screen. This first presentation of data in simple list format allows for simple and fast recognition and use of the data on relatively small screens, e.g. 15" (large touchscreens are very cost prohibitive for small business systems). This is the tip of the pyramid. If the user needs or desires more detail, the user interface is designed to allow it. For example, from the client list, the user can touch client details and get more information about that client presented using the full screen. More and wider info/detail is available if the user desires it by going deeper into the pyramid. However, each screen is optimized for easy understanding give the constraint of a smaller screen size than typical computers today (e.g. 1440×900 pixel, 21" diagonal).

The client may call to arrange an appointment and services. In the example of a beauty salon, a customer can call to make an appointment that includes hair coloring, a haircut, and a manicure. The hair coloring is performed by a given colorist, i.e. Colorist1, the haircut is performed by a given haircutter, i.e. Haircutter1, and the manicure is performed by a given manicurist, i.e. Manicurist1. Colorist1, Haircutter1, and Manicurist1 are independent contractors of the salon. Colorist1, Haircutter1, and Manicurist1, each have a respective credit-card merchant account pre-established: i.e. merchant account 1, merchant account 2, and merchant account 3.

The salon acts as the house and charges the merchants for the opportunity to sell services within the salon. An apportionment system is entered in the system. Example apportionment systems include the following. Flat fee per given time is a system where a set amount is remitted to the house merchant account and, once the amount is reached, the providing merchant account is paid; an example is $500 per month. Another system is a percentage of each transaction: for example 25% of each transaction being paid to the house merchant account.

The invention provides a touchscreen method for booking a multiple-service ("itinerary") appointment for a client in a desired day. A client calls the salon and asks for an itinerary appointment where Colorist1, Haircutter1, and Manicurist1 may be available to fit his/her requested start time. The system creates permutations out of available potential providers' appointments and ranks them by their availability times. The vendor can then book all the appointments for each provider in one action.

The system provides a touchscreen method for setting up and providing reminders to confirm the appointments at a given time (for example, one day or one week) in advance. These reminders include automatic emails and SMS text messages. The system connects to an Internet mail server that sends the reminders. The message is customized by the salon. Database information is merged into the message such as the customer's name as well as the appointments and the vendor.

The client arrives, is checked in at the salon on the touchscreen, the appointment in the book changes color to indicate the new "checked in" status, and the client is ready to receive the services.

At checkout, the system creates a Ticket for the client for the services and products provided. Prices for services and products are included in the ticket.

Next, the client pays the house. Payment can be made with cash, check, credit card or cards, gift cards, or a combination thereof. Other means of payment are possible. In the case of a credit card or cards, a payment slip with an amount is given for each card. With as little as a single card swipe, the client can pay the entire ticket. The system then apportions the payment and credits the respective merchant accounts. Signature slips are provided to conform with the credit-card provider's (e.g. VISA®, MASTERCARD®, and AMERICAN EXPRESS®) rules. If a credit-card provider requires a separate signature slip for each merchant account being credited, then the system provides a separate signature slip. If the credit-card provider allows a single signature to provide for multiple charges and/or line item charges that are credited to different merchant accounts then a combined signature sheet is generated. Combining signature sheets makes checkout easier for the client and reduces the number of signature slips that the house (i.e. the salon) must retain.

The system allows for simple refunds. If the client requests a refund, the clerk can check the items being returned. The system then removes the necessary funds from the respective merchant account or accounts. Accounts not being refunded are not deducted. The refund is then paid to the client or the customer's credit card is credited.

The method can be run on a terminal. Preferably, the terminal has a touchscreen for entering data. A cash drawer is connected to the touchscreen. A credit-card reader is attached for reading account information from clients' credit cards. A network interface is included for connecting the terminal to the credit-card processor by a secure network. Preferably, the network is a TCP/IP network such as the Internet.

The system can store transaction data. Transaction data can be used to form reports such as 1099 slips for independent contractors. The amounts reported for payment to 1099 vendors are calculated based on commission rates set in the system by management.

A single ticket is generated even though multiple merchants may be paid.

The system provides for transactions that fail mid-transaction. If the credit-card processor declines a transaction, the system allows other payment means to be entered and retried. For example, if a client purchases a coloring for $25, a haircut for $50, and a manicure for $100, and the client only has an available balance of $30 on her credit card, the second transaction will be declined. Next, the first transaction for $25 is voided automatically. A reason is provided for the declination to the customer. The client then can use a different means of payment or combine payments. Upon completion, a receipt for the payments is prepared and given to the customer.

While goods and services will have default prices, the system allows for touchscreen overrides of these prices by the vendor while finalizing the ticket.

The system combines a touchscreen scheduling calendar (i.e. a Book), a ticket preparer (i.e. Ticket Manager), and payment receiving for tracking incoming payments and matching them with clients' tickets and histories.

The system prepares reports based on individual merchant accounts. Unlike the prior art, the system allows for merchant account reporting for one or multiple merchants for selectable date ranges anytime.

The system allows a house, such as a beauty salon, to set in motion a computer to submit a series of credit card transactions for paying to multiple merchant accounts. In contrast, the prior art provides for a first transactions to be submitted to a first merchant account; next, a second transaction is entered into the terminal and the second transaction is processed and delivered to the second merchant account.

The system tracks estimated and actual time for performing services. This information can be used to produce reports on productivity and profitability.

The touchscreen provides a user interface system for entering and viewing data about customers, products, services, vendors, staff, appointments, marketing, system and business settings, and other related data important to operating the business (e.g. reports).

A first subsystem is a touchscreen Appointment Builder. The appointment builder combines various databases to allow fast and efficient scheduling of appointments with several merchants within a business, such as a beauty salon. An object of the invention is to minimize the use of a keyboard by innovative user interface design on the touchscreen. The appointment builder allows for client selection from a "client list" presented from the client database. The list may be six to eight (6-8) lines (more or less) displayed in one field, each name on a line selectable by touch. The client list is first presented as only the vendor's list of clients sorted by first name. Using only the touchscreen, the list can be resorted by last name at the touch of a touch button on the screen. Again, using only the touchscreen, the client list can be changed to the entire business' client list sorted by last name, and again simply changed by a touch to be sorted by first name. By employing this unique process, the booking time on a touchscreen system is likely much faster by increasing the likelihood that the desired client is selectable with just a few touches of the screen (using page up and page down touch buttons). Selection can be made using the touchscreen or predictive text keyboard or screen-based keypad entry, or by client's phone number (the telephone number search is detailed below), again using a touchscreen number pad. The system allows for adding and updating client records within the client database including assignment as a particular staff's client. The appointment builder allows for selection of services to be provided from a "services list". The services list is related to the staff member in the staff database that includes which services each staff member is able/authorized to perform and, therefore, able to be scheduled. When an appointment in the book is touched, the point touched is defined as Staff member (column)×time of day (row). Once touched, the Appointment Builder displays and the Staff's services are listed by frequency of booking for that staff member (versus alphabetically as typical). Sorting by most frequently booked for the given staff member allows for minimal scrolling whenever selecting a service thereby decreasing the time required to book an appointment. The database periodically analyzes each staff's bookings and ranks their services for display in the appointment builder in order to ensure the highest likelihood of reduced booking time. The appointment scheduler allows times and prices to be "nudged" to adjust the actual booked time and price up or down away from the default in the database for any given service to be booked for an appointment. The adjustments persist into the calendar for an appointment and into the Ticket Manager for payment and reporting. The appointment builder provides a touchscreen entry method for standing (i.e. repeating) appointments and can include processing time for "squeezing in" an appointment during the processing time.

The system provides a means for searching for a given customer in a customer database by using the customer's telephone number. Whenever a given customer is to be selected (for example, when making, changing, or confirming an appointment), the system allows the customer to be selected by telephone number. Telephone numbers are easier in some situations to enter than names, which may be difficult to spell. The touchscreen can be used to enter the telephone number. If the customer is existing, the system pulls additional information (e.g. name, address, or even a photograph) to help the user confirm the client. Several customers (for example, a mother and daughter or husband and wife) may share the same telephone number. The touchscreen allows one of the matching customers to be selected. If the telephone number does not match any of the existing customers, the system and method provide a means for readily entering a new customer into the database.

The system provides a unique touchscreen appointment manager for manipulation of existing appointments. Once an appointment is booked, the appointment is visible in the calendar under the staff member providing the services and on the day and time of the appointment representing the duration of the appointment. To manipulate the existing appointment, the system provides a touchscreen method for simply touching the appointment, which in turn opens the appointment manager. The appointment manager allows for simple one-touch confirmation and check-in of appointments, thereby changing the appearance of the appointment in the calendar to indicate the change of state to "confirmed" or "checked in". One example of appearance change is to change the color of the appointment; another may be to change the background of the appointment, e.g. to a picture or texture. The appointment manager allows for other modifications of an existing appointment such as: change/delete/add of services, and cancellation and modification of a series (repeating) appointment. The invention provides a unique and novel touchscreen method of moving an appointment in time, day, and/or to a different stylist. In contrast to typical methods using click, drag, and drop, the invention's touchscreen method allows the user to touch "modify" on an existing appointment which puts the appointment in modify mode. One of the choices in modify mode is "move appointment". Touching move appointment hides the appointment and places a marker in the edge of the display. Now the user can touch a different time and/or staff member and/or navigate to a completely different day. Once the desired time, day, and staff member "destination" is touched, the appointment is reopened and can be saved in its new location. If the user wishes to cancel the move, they simply touch the marker to open the original appointment. This unique touchscreen method allows for the most flexibility in moving an appointment while maintaining a very simple calendar-day display; versus typical systems that clutter the display with monthly and weekly calendars and pop-ups thereby shrinking the available display area for the day's calendar. The method described here also uniquely and novely provides the user with the use model most similar to how this task is done using a paper appointment book, allowing for almost immediate assimilation.

The system allows for very simple automatic email messages whereby a user touchscreen provides fields for entering text for automatically-sent emails; e.g. birthday, thank you, and appointment reminder. All the user needs to do is type in the generic messages for each and the system will send: the birthday message out to all clients with emails and clients' family a given time period (e.g. twenty-one (21) days) prior to their birthdays recorded in the system, the reminder message a given period (e.g. three (3) days) prior to an appointment to all client's with emails, and thank you message a given period (e.g. two (2) days) after an appointment to all clients with emails. The automated emails can be enabled and disabled by simply touching a check box for that message.

The system provides a unique touchscreen "Trade Show" function wherein the vendor can benefit from industry news, product specials, technique announcements and tutorials, continuing education, and a social network of like practitioners; benefits traditionally only available in person at an industry tradeshow. Vendors and merchants can learn about new products and techniques by visiting the touchscreen Tradeshow much like a live trade show.

The system stores client emails in the client database for booking and confirming appointments. Promotional marketing update, and appointment reminder emails and text messages may be sent to customers and staff using the touchscreen messaging function of the system as well.

The system includes a touchscreen method for providing and accounting for gift and loyalty cards for the merchants. This subsystem allows for a pre-printed bar code card to be scanned with a barcode scanner and the number scanned from the card is associated with a client purchase and account. An amount is associated to the purchase by the vendor and the system allows for the card to be debited for purchases against appointment services and/or products by scanning the barcode on the card and correlating the number with the client's record for available balance on their account. The cards are reusable and re-assignable to other clients.

EXAMPLE PURCHASE

FIG. 1 shows a model purchase that can be used to illustrate many aspects of the invention. Two customers, CUSTOMER1 and CUSTOMER2 are customers purchasing goods and/or services of a business. The business referred to in FIG. 1 as HOUSE. One preferred embodiment of the business is a beauty salon. A beautify salon is an example of a suitable business. The example is continued throughout the specification. However, the device, method, and system of the invention can be applied in many situations beyond the beauty salon example. The customers can share expenses. In the example of the beauty salon, the first customer CUSTOMER1 can be a mother and the second customer CUSTOMER2 is a daughter.

Each of the customers CUSTOMER1 and CUSTOMER2 receive products or services from two merchants MERCHANT1 and MERCHANT2. The merchants are independent contractors working within the salon HOUSE. For this example, MERCHANT1 is a hair stylist. MERCHANT2 is a hair colorist. MERCHANT1 provides each customer CUSTOMER1 and CUSTOMER2 with a haircut. MERCHANT2 provides each customer CUSTOMER1 and CUSTOMER2 with a hair coloring. MERCHANT1 gives the salon HOUSE an invoice for each haircut. MERCHANT2 gives the salon HOUSE and invoice for coloring.

The salon HOUSE has a computer also referred to as a terminal. The invoices can be directly entered into the computer by the merchants MERCHANT1 and MERCHANT2. Alternatively, the merchants MERCHANT1 and MERCHANT2 can prepare a handwritten invoice. The salon HOUSE then enters the handwritten invoice into the computer.

For purposes of illustrating all of the features of the invention, the customers CUSTOMER1 and CUSTOMER2 agree to share a total cost of the services provided by the merchants MERCHANT1 and MERCHANT2. In addition, each customer pays in part with cash and two credit cards CARD1, CARD2, CARD3, and CARD4. The salon HOUSE has a credit-card reader attached to the computer. The credit-card reader reads the account information from the magnetic strip on the credit card. The salon HOUSE has a cash tray attached to the computer. The amount of cash that each customer pays is entered into the computer. The cash is placed into the cash drawer. The customers CUSTOMER1 and CUSTOMER2 are each asked to provide merchant apportionment information. Merchant apportionment information provides a percentage or amount that each merchant is to be charged by a given customer. The customers CUSTOMER1 and CUSTOMER2 are each asked to provide credit-card apportionment information. Credit-card apportionment information provides a percentage or amount that each credit card of each customer will be charged. Customer apportionment information is collected by the salon HOUSE. The customer apportionment information provides a percentage or amount of the bill that each customer will pay.

A computer at the house then forms all of the combinations. Computer algorithms for forming combinations are well known and are not detailed in this application. In the example shown in FIG. 1, there are sixteen (16) combinations:

CUSTOMER1/MERCHANT1/CARD1
CUSTOMER1/MERCHANT1/CARD2
CUSTOMER1/MERCHANT1/CARD3
CUSTOMER1/MERCHANT1/CARD4
CUSTOMER1/MERCHANT2/CARD1
CUSTOMER1/MERCHANT2/CARD2
CUSTOMER1/MERCHANT2/CARD3
CUSTOMER1/MERCHANT2/CARD4
CUSTOMER2/MERCHANT1/CARD1
CUSTOMER2/MERCHANT1/CARD2
CUSTOMER2/MERCHANT1/CARD3
CUSTOMER2/MERCHANT1/CARD4
CUSTOMER2/MERCHANT2/CARD1
CUSTOMER2/MERCHANT2/CARD2
CUSTOMER2/MERCHANT2/CARD3
CUSTOMER2/MERCHANT2/CARD4

For each combination, an amount is calculated based on the cash paid, the merchant apportionment information, the credit-card apportionment information, and the customer apportionment information. The computer is connected via the Internet to a credit-card processor PROCESSOR. Each of the combinations is transmitted as its own credit-card transaction. Each credit-card transaction includes an amount a credit-card account information to which the amount is to be charged, a merchant account MERC1 MID or MERC2 MID to which the processor is to which the credit-card processor PROCESSOR is to deposit.

The credit-card processor PROCESSOR confirms that each transaction is within an available balance for the credit-card in the transaction. If the amount is within the available balance, the credit-card account is billed that amount and the respective merchant account MERC1 MID or MERC2 MID is credited; a confirmation number is transmitted to the salon HOUSE by the credit-card processor PROCESSOR. If the amount exceeds the available balance, the credit-card account is not billed and no money is paid to the merchant account MERC1 MID or MERC2 MID; a declined message is sent from the credit-card processor PROCESSOR to the salon HOUSE. In one preferred embodiment, once one declined message has been received, no further transactions are submitted and previously-approved transactions are canceled by sending a cancellation message to the credit-card processor PROCESSOR. In an alternate embodiment, after a decline message is received, the bill is updated with the allowed transactions and the customer can then enter a new combination of cash, credit cards, and apportionment information. After a declination, the customer can pay more cash, provide a different credit-card, and/or change the merchant apportionment information, credit-card apportionment information, and customer apportionment information. After making changes, the salon can resubmit the combination of transactions to the credit-card processor PROCESSOR.

For each customer, the salon HOUSE prints a receipt and a confirmation copy on a printer attached to the printer. Both the receipt and confirmation copy contain a line item for each charge. Each line item includes the amount charged, the good or service to which it is applied, and the credit card on which the charge was made. The customer can sign a paper copy or sign digitally a confirmation copy for the salon HOUSE.

In one embodiment, the salon HOUSE charges a portion of each invoice submitted by each merchant MERCHANT1 and MERCHANT2. When the salon HOUSE creates transactions for each combination, a portion is deducted from each transaction. The portion can be a flat fee or a percentage or a combination thereof. So for each transaction submitted to the processor, a related transaction is submitted to the processor for the house. When the processor PROCESSOR approves the related transaction, an amount is deposited into the salon's credit-card merchant account HOUSE MID. The transaction is associated with the transaction. In case a refund is requested, both the transaction and the associated transaction are undone. The split between the house and the merchant are hidden on the receipt so the customer only sees the total transaction.

Figure 2:
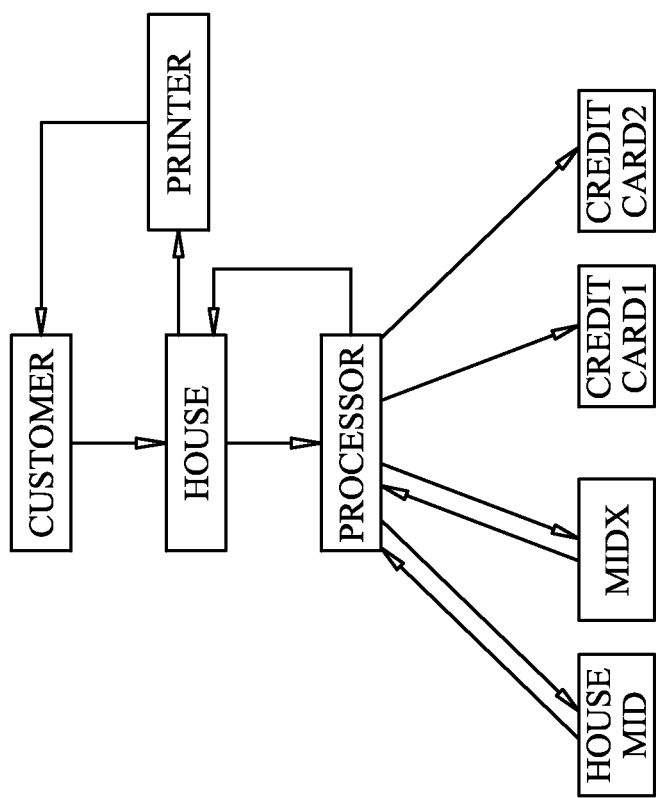
FIG. 2 is a schematic diagram of a return.

FIG. 2 shows a sample refund transaction. A customer CUSTOMER comes to a business (e.g. a salon) HOUSE and asks for a refund for a good or service. If the customer CUSTOMER has a receipt, a particular transaction or transactions can be identified for refund and selected by entering the transaction number and/or numbers into a computer at the salon HOUSE. If the customer CUSTOMER does not have a receipt, the transaction can be found by searching the database of transactions stored in the computer or stored with the processor. The database can be searched by customer name, date of transaction, amount, credit-card number, merchant, and good or service.

Once the particular transaction is found, the transaction number is transmitted to the credit-card processor PROCESSOR via a computer network such as the Internet. The transaction number to be reversed is sent to the credit-card processor PROCESSOR along with a reversal instruction. The credit-card PROCESSOR then removes funds from the merchant account MIDX and credits the credit-card account of the customer. Any portion removed by the credit-card processor is also returned. If the house deducted a portion of the original transaction, the related transaction to the salon's merchant account HOUSE MID is also undone. In this way, the full amount is returned to the customer. A cancellation code is transmitted to the salon HOUSE for each refunded transaction. The computer at the salon HOUSE saves the cancellation code. A return receipt is printed by a printer attached to a computer at the salon HOUSE. If the good or service was paid for by multiple credit cards, then multiple instructions are sent to the credit-card processor to refund each respective CREDIT CARD.

In a preferred embodiment, the credit-card merchant accounts established based on the business' (e.g. the salon's) qualifications. The business then leases the pre-established, pre-qualified merchant account to a merchant. The merchant account is given to the business HOUSE based on the qualifications of the salon HOUSE, not the merchant. The merchant (i.e. vendor) pays the salon a fee for renting the business' merchant account. The fee paid by the merchant to the business is preferably a flat monthly fee. In this way, the business HOUSE has merchant accounts pre-established. No time is lost while establishing an account when a new merchant is added or a merchant is replaced.

When the house has pre-established and pre-qualified merchant accounts, in a preferred embodiment, the merchant account is linked to a bank account of the merchant and a bank account of the house. When the account is settled, a portion of the money collected in the rented merchant account is paid into the house's bank account. The remainder is paid into the merchant's bank account.

The computer of the house records all of the transactions. The transactions are reconciled with a statement. The computer apportions the money so the salon HOUSE does not need to make difficult calculations for sharing fees.

We claim:

1. A method for a house to charge a credit card of a customer on a single bill to credit a first credit-card merchant account of a first merchant for a good or service provided by the first merchant and a second credit-card merchant account of a second merchant for a good or service provided by the second merchant, which comprises:
   providing the house with first credit-card merchant account information of the first merchant account;
   providing the house with second credit-card merchant account information of the second merchant account;
   receiving a first invoice from the first merchant for a first good or service provided by the first merchant to be paid by the customer;
   receiving a second invoice from the second merchant for a second good or service provided by the second merchant to be paid by the customer;
   forming the bill by summing the first invoice and the second invoice, while storing the first invoice and the second invoice;
   providing the bill to the client;
   paying a payment of at least a portion of the bill with at least a first credit card of the customer by providing the house with credit card account information;
   inputting merchant apportionment information for dividing the payment between the first invoice and the second invoice by the house;
   calculating by the house, using a processing device, a first-merchant credit-card amount from the payment and the merchant apportionment information;
   calculating by the house, using the processing device, a second-merchant credit-card amount from the payment and the merchant apportionment information;
   providing by the house to a processor the credit card account information, the first-merchant credit-card amount, and the first credit-card merchant account information in a first transaction; and
   providing by the house to the processor the credit card account information, the second-merchant credit-card amount, and the second credit-card merchant account information in a second transaction.

2. The method according to claim 1, which further comprises:
   receiving a confirmation from the processor for the first transaction; and
   storing the confirmation with the house.

3. The method according to claim 1, which further comprises providing the customer with only one customer confirmation for confirming the first transaction and the second transaction.

4. The method according to claim 1, which further comprises deducting a processor fee from the first merchant amount.

5. The method according to claim 1, which further comprises:
   establishing a merchant account with associated credit-card house account information; and
   deducting at least a portion of said payment for the house when calculating the first merchant amount; and
   providing the processor with the credit-card account information, the at least a portion of said payment for the house, and the credit-card house account information.

6. The method according to claim 1, which further comprises:
   paying a portion of the bill with a second credit card of the customer by providing the house with second-credit-card account information;
   inputting credit-card apportionment information;
   including the credit-card apportionment information when calculating the first-merchant credit-card amount;
   including the credit-card apportionment information when calculating the second-merchant credit-card amount;
   calculating a first-merchant second-credit-card amount from the payment, the merchant apportionment information, and the credit-card apportionment information;
   calculating a second-merchant second-credit-card amount from the payment, the merchant apportionment information, and the credit-card apportionment information;
   providing the processor with the second credit-card account information, the first-merchant second-credit-card amount, and the first credit-card merchant account information in a third transaction; and
   providing the processor with the second credit-card account information, the second-merchant second-credit-card amount, and the second credit-card merchant account information in a fourth transaction.

7. The method according to claim 1, which further comprises:
providing the first good or service to the customer; and
providing the second good or service to a second customer, wherein paying a payment of at least a portion of the bill with at least a first credit card and a second credit card of the customer or the second customer by providing the house with the credit card accounts information and wherein payments are processed from multiple credit card sources to multiple credit-card merchant accounts.

8. The method according to claim 1, which further comprises providing a computer including:
means for entering the credit-card merchant account information;
means for entering the invoices; means for calculating the bill;
means for displaying the bill to the client;
means for entering credit card account information;
means for inputting the merchant apportionment information;
means for calculating the credit-card amounts; and
a means for connecting to a computer network, the computer network being connected to the processor.

9. The method according to claim 2, which further comprises providing a computer including:
means for entering the credit-card merchant account information;
means for entering the invoices; means for calculating the bill;
means for displaying the bill to the client;
means for entering credit card account information;
means for inputting the merchant apportionment information;
means for calculating the credit-card amounts;
means for connecting to a computer network, the computer network being connected to the processor; and
means for storing the confirmation from the processor.

10. The method according to claim 1, which further comprises:
receiving cash providing for a portion of the bill;
entering cash information reflecting an amount of cash received;
including the cash information when calculating the first-merchant credit-card amount.

11. The method according to claim 1, wherein:
the house is a beauty salon; and
the first merchant and the second merchant are workers in the beauty salon.

12. The method according to claim 11, wherein said workers have careers selected from the group consisting of a hair stylist, a hair colorist, a shampooer, a manicurist, a pedicurist, aesthetician, teeth whitening technician, and a masseuse or masseur.

13. The method according to claim 1, which further comprises:
receiving a declination for one of the transactions from the processor; and
providing the house with replacement credit card information;
providing the processor with the replacement credit card account information, the first-merchant credit-card amount, and the first credit-card merchant account information in a first transaction; and
providing the processor with the replacement credit card account information, the second-merchant credit-card amount, and the second credit-card merchant account information in a second transaction.

14. The method according to claim 1, which further comprises:
receiving a declination for one of the transactions from the processor;
paying a portion of the bill with a second credit card of the customer by providing the house with second credit-card account information after receiving the declination;
inputting credit-card apportionment information;
calculating a first-merchant second-credit-card amount from the payment, the merchant apportionment information, and the credit-card apportionment information;
calculating a second-merchant second-credit-card amount from the payment, the merchant apportionment information, and the credit-card apportionment information;
providing by the house to the processor the credit-card apportionment information, the credit card account information, the first-merchant credit-card amount, and the first credit-card merchant account information in a replacement first transaction; and
providing by the house to the processor the credit-card apportionment information, the credit card account information, the second-merchant credit-card amount, and the second credit-card merchant account information in a replacement second transaction;
providing the processor with the second credit-card account information, the first-merchant second-credit-card amount, and the first credit-card merchant account information in a third transaction; and
providing the processor with the second credit-card account information, the second-merchant second-credit-card amount, and the second credit-card merchant account information in a fourth transaction.

15. The method according to claim 1, which further comprises:
receiving a declination for one of the transactions from the processor;
receiving cash providing for a portion of the bill after receiving the declination;
entering cash information reflecting an amount of cash received;
calculating a first-merchant credit-card amount from the payment, the cash information, and the merchant apportionment information;
providing the processor with the credit card account information, the first-merchant credit-card amount, and the first credit-card merchant account information in a replacement first transaction.

16. The method according to claim 1, which further comprises:
opening the first credit-card merchant account based on credentials of the house; and
leasing the first credit-card merchant account from the salon to the first merchant.

17. An apparatus enabling a house to charge a credit card of a customer on a single bill to credit a first credit-card merchant account of a first merchant for a good or service provided by the first merchant and a second credit-card merchant account of a second merchant for a good or service provided by the second merchant, comprising:
a memory storing computer instructions;
a first processor communicatively coupled to the memory, wherein the first processor, responsive to executing the computer instructions, performs operations comprising:
providing the house with first credit-card merchant account information of the first merchant account;
providing the house with second credit-card merchant account information of the second merchant account;

receiving a first invoice from the first merchant for a first good or service provided by the first merchant to be paid by the customer;

receiving a second invoice from the second merchant for a second good or service provided by the second merchant to be paid by the customer;

forming the bill by summing the first invoice and the second invoice, while storing the first invoice and the second invoice;

providing the bill to the client;

paying a payment of at least a portion of the bill with at least a first credit card and a second credit card of the customer by providing the house with credit card accounts information;

inputting merchant apportionment information for dividing the payment between the first invoice and the second invoice by the house;

calculating by the house a first-merchant credit-card amount from the payment and the merchant apportionment information;

calculating by the house a second-merchant credit-card amount from the payment and the merchant apportionment information;

providing a second processor the credit card accounts information, the first-merchant credit-card amount, and the first credit-card merchant account information in a first transaction directly from the house; and providing the second processor the credit card accounts information, the second-merchant credit-card amount, and the second credit-card merchant account information in a second transaction directly from the house, wherein payments are processed from multiple credit card sources to multiple credit-card merchant accounts.

* * * * *